May 24, 1966  J. C. MORRISON  3,253,185
TRANSISTOR IGNITION SYSTEM AND PULSE GENERATOR THEREFOR
Filed Dec. 5, 1960  2 Sheets-Sheet 2
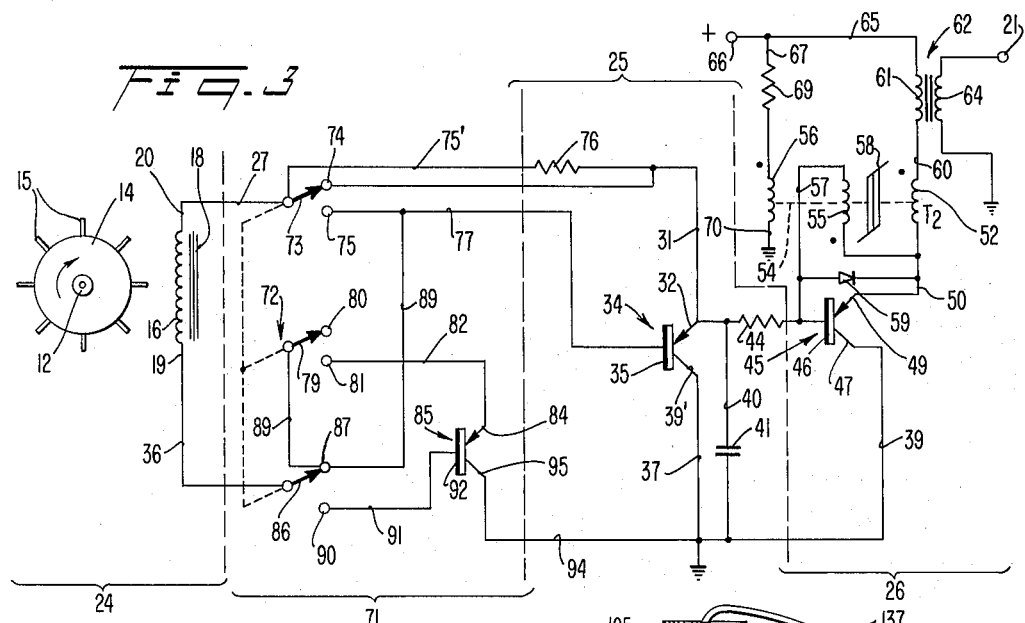
Fig.3
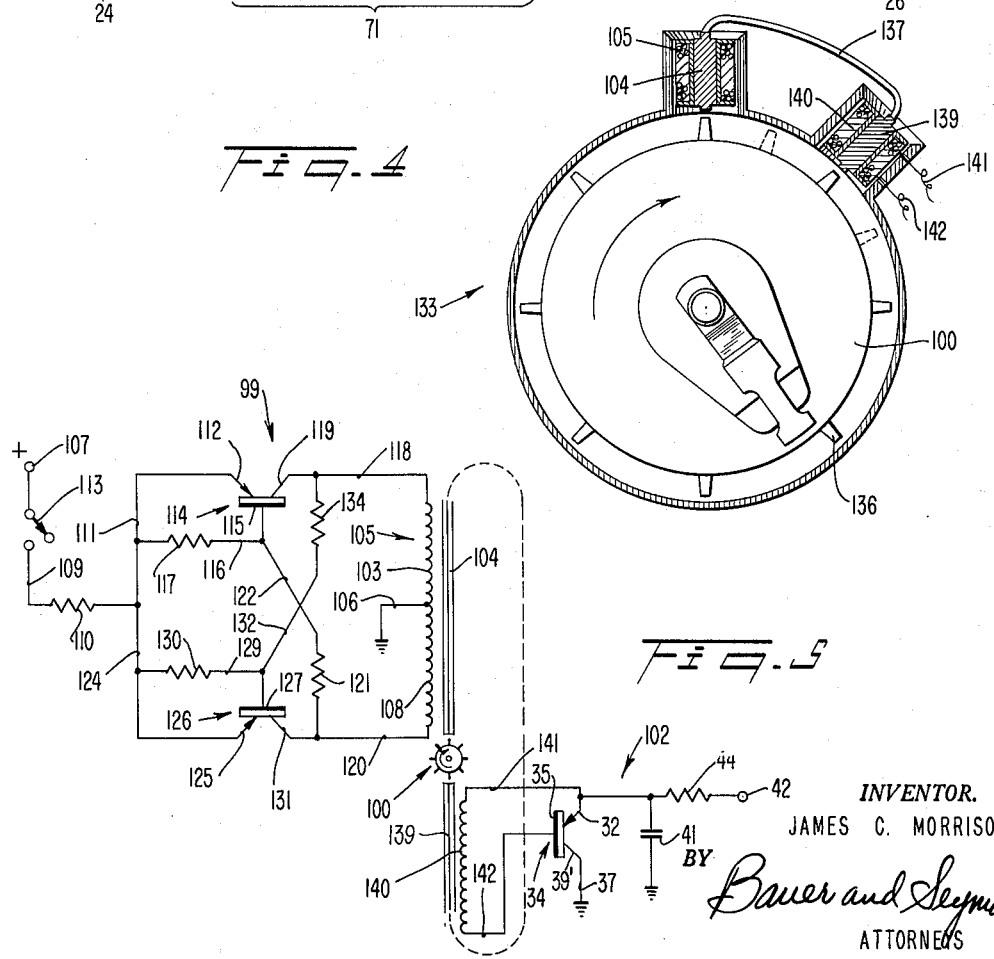
Fig.4
Fig.5
INVENTOR.
JAMES C. MORRISON
BY
Bauer and Seymour
ATTORNEYS

United States Patent Office 3,253,185
Patented May 24, 1966

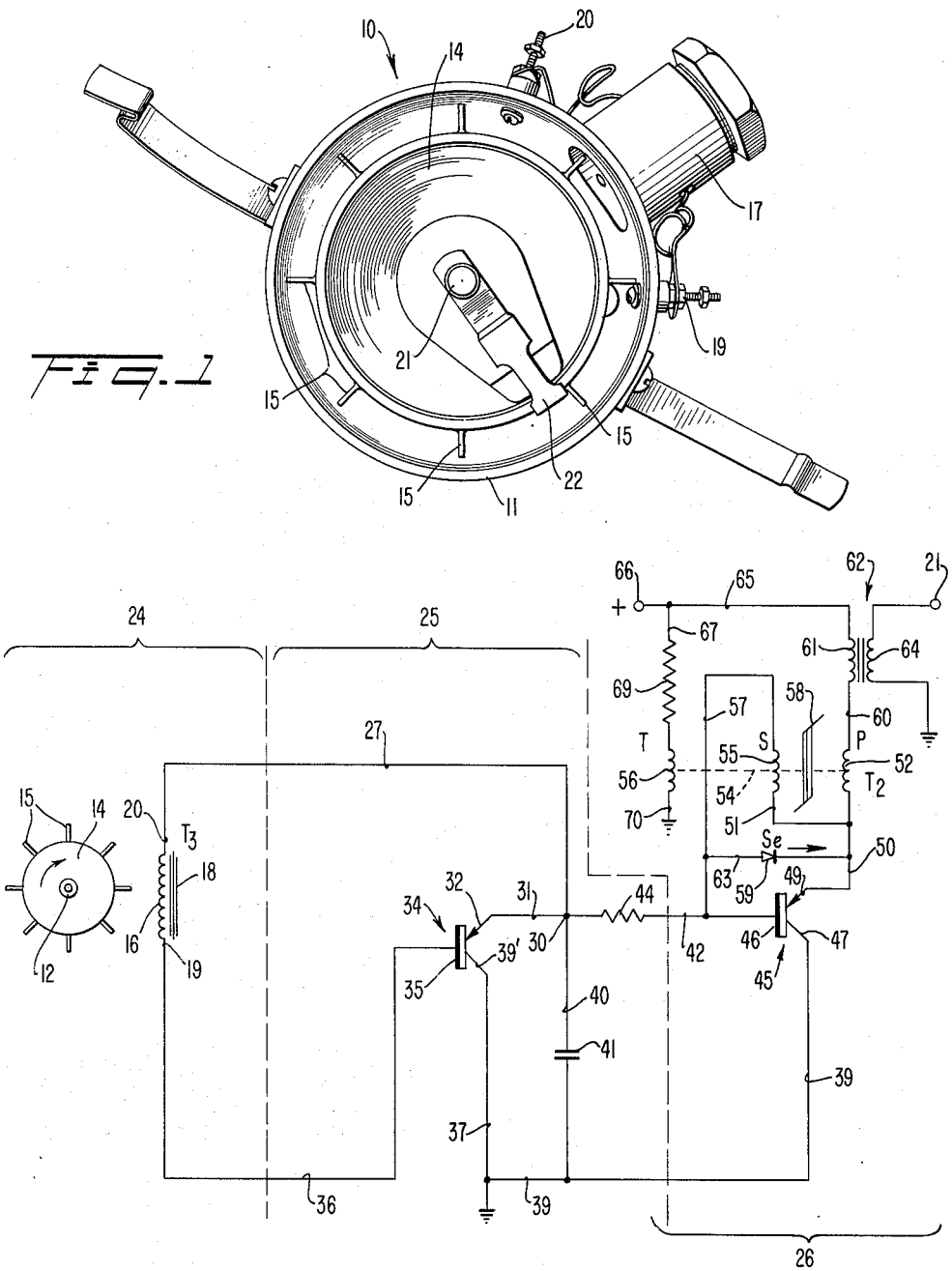

3,253,185
TRANSISTOR IGNITION SYSTEM AND PULSE GENERATOR THEREFOR
James C. Morrison, Sidney, N.Y., assignor to The Bendix Corporation, Sidney, N.Y., a corporation of Delaware
Filed Dec. 5, 1960, Ser. No. 73,875
20 Claims. (Cl. 315—201)

This invention relates to an ignition system, and more particularly relates to a breakerless ignition system for use with internal combustion engines.

The invention has among its objects the provision of a simple, reliable breakerless battery ignition system adapted for use with internal combustion engines.

A further object of the invention lies in the provision of an ignition system of the type indicated which is characterized by its exceptionally long trouble free life and its excellent high speed performance.

A stlil further object of the invention lies in the provision of a novel ignition system wherein the conventional breaker points and their resultant maintenance problems are eliminated.

Another object of the invention lies in the provision of an ignition system wherein the energy of the spark discharge output remains the same regardless of variations in engine speed.

Yet another object of the invention lies in the provision of novel timing means for triggering the ignition system of the invention.

A further object of the invention lies in the provision of a novel means augmenting the output of the timing or triggering means of the system as during the starting of the engine.

Another object of the invention lies in the provision of a novel device for supplying the ignition system of the engine with a timed shower or burst of discharge impulses, whereby to facilitate the starting of the engine.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in plan of a first embodiment of a device combining timing or triggering means and distributor means in accordance with the invention;

FIG. 2 is a circuit diagram of a first embodiment of ignition system in accordance with the invention;

FIG. 3 is a circuit diagram of a second embodiment of ignition system in accordance with the invention, such circuit incorporating means to facilitate starting of the engine;

FIG. 4 is a view in plan of a second embodiment of a device combining means for timing or triggering the ignition circuit and means for distributing high tension current surges in timed sequence to a plurality of spark discharge devices; and FIG. 5 is a wiring diagram of a circuit for producing a timed shower of sparks for starting an engine provided with an ignition system in accordance with the invention.

In the last decade, automotive engines have been developed which produce more and more horsepower at higher and higher speeds. Such greater horsepower has been greatly the result of increased compression ratios, which in turn call for better fuels and higher voltage spark discharges to fire such fuels. In order to develop higher voltage for ignition it is necessary either to increase the battery voltage and the inductance of the ignition coil or to break more primary current. The conventional use of breaker points prohibits, as a matter of practice, the increasing of the primary current in battery ignition systems beyond its present value of somewhat less than five amperes. If the breaker current were increased beyond such value, breaker point life would be greatly reduced. The elimination of breaker points by ignition systems in accordance with the invention therefore removes a prime limitation inherent in breaker-equipped battery ignition systems.

In FIG. 1 there is shown a combined timing or triggering means and distributor for use in the first disclosed embodiment of the ignition system of the invention. Such device, which is generally designated 10, is designed to be employed with an eight-cylinder four-cycle internal combustion engine. Device 10 has a housing 11 in which there is journalled a shaft 12 (FIG. 2) which is driven in synchronism with the crank shaft of the engine and at one-half its speed. On shaft 12 there is affixed a trigger wheel 14 which is made of magnetic metal such as steel and has eight equally angularly spaced radially projecting timing fingers 15 on its rim. Fingers 15 sweep through the magnetic field of a trigger coil 16 which is mounted within a radially disposed sub-housing 17 on housing 11. The trigger coil 16 has a permanent magnetic core 18 therewithin, the core being disposed radially of housing 11. The wheel 14 is so disposed relative to shaft 12 that each triggering finger 15 sweeps across the end of magnetic core 18 at a time when there is a demand for a spark discharge by the engine. Coil 16 is provided with lead wires and terminals, such terminals, designated 19 and 20, being conveniently fixed to housing 11, as shown. Shaft 12 also carries a conventional distributor arm having a central contact 21 and an outer moving contact 22. Contact 22 is designed to cooperate successively with eight equally angularly spaced contacts on a distributor cap (not shown) affixed to housing 11. It will be understood that the eight terminals on the distributor cap are connected to the respective spark discharge devices or plugs of the engine.

The ignition circuit shown in FIG. 2 may be considered as having three main portions or stages: a timing stage 24, an amplifier stage 25, and a monostable multivibrator stage 26. Stage 24 is composed of the above-described triggering wheel 14, triggering fingers 15, coil 16, and core 18. The output of coil 16 is fed to the amplifier stage 25, as shown. Thus a wire 27 connects terminal 20 of the coil to a junction 30 in the amplifier circuit. Junction 30 is connected by a wire 31 to the emitter 32 of a transistor 34. The other terminal 19 of coil 16 is connected by a wire 36 to the base 35 of transistor 34. The collector 39' of transistor 34 is connected to ground by wire 37. The amplifier stage is completed by a lead wire 42 connected to junction 30, a resistor 44 interposed in wire 42, a lead wire 39 extending from wire 37, and a condenser 41 connected in shunt with the emitter 32 and the collector 39' by a wire 40.

The coil 16 is so wound that, with triggering wheel 14 rotating in the direction indicated, a positive voltage appears on wire 27 each time a triggering finger 15 enters the magnetic field of core 18. Because of the impedance of coil 16, the base 35 of transistor 34 then has a potential lower than that of emitter 32. Transistor 34 is thus rendered conductive, so the current from a source of positive direct current (terminal 66 to be described) may flow from wire 42 through resistor 44, emitter 32, to collector 39', and thence to ground. Such momentary flow or pulse of current is employed to power the stage 26 of the system and to generate a high tension spark discharge.

Stage 26 of the ignition circuit includes a transistor 45 having a base 46 to which the wire 42 is connected. Transistor 45 has a collector 47 which is connected to the collector 39' of transistor 34 and to ground by wire 39. The emitter 49 of transistor 45 is connected by a wire 50 to the primary 52 of a first, saturable core transformer 54 and by a branch wire 51 to the secondary 55 of such transformer. Transformer 54 has a third winding or tertiary 56 whose function will be explained below. The other end of secondary 55 is connected by a wire 57 to wire 42 between resistor 44 and the base 46 of transistor 45. A wire 63 having diode rectifier 59 interposed therein is shunted across wires 50 and 57. The diode prevents the multivibrator from going into self-excited oscillation by shorting out positive pulses appearing at wire 57.

Transformer 54 has a saturable core 58. The upper end of primary 52 is connected by a wire 60 to the primary 61 of a second, step-up output transformer 62. The other end of primary 61 is connected to the above-mentioned positive terminal 66 of the direct current power source by a wire 65. Terminal 66 may be, for example, the positive terminal of a suitable battery, the negative terminal of the battery being connected to ground. Transformer 62 has a secondary 64, one end of which is connected to ground, as shown, and the other end of which is connected to the center contact 21 of the triggering and distributing device shown in FIG. 1.

The tertiary 56 of transformer 54 is connected at one end to terminal 65 of the direct current power source by a wire 67 and a series connected resistor 69. The other end of tertiary 56 is connected to ground by wire 70. The tertiary functions to bias the saturable core 58 toward the negative saturation area, specifically toward the third quadrant, of the hysteresis loop of the core. The above-described circuit of stage 26 is, in effect, a monostable multivibrator made up of transistor 45 and transformer 54, there being a load on such multivibrator in the form of the output transformer 62. When a signal from the trigger coil 16 transmitted through transistor 34 appears at the base 46 of transistor 45, current flows from emitter 49 to base 46 and thus causes an amplified emitter-collector current to flow from terminal 66 through the primary 52 of transformer 54 by way of wire 65, primary 61 of transformer 62, wire 60, emitter 49, collector 47, and wire 39. The base signal is now removed, after having completed its function, by the rotation of the then-active triggering finger 15 out of the magnetic field of core 18. As current increases in the primary 52 of transformer 54, voltage is induced in the secondary 55. Such secondary voltage causes a self-excited current to flow in the loop 55, 51, 50, 49, 46, 42, and 57. The impedance of secondary 55 causes the base 46 to be negative with respect to emitter 49; a base current thus flows in transistor 45. Such regenerative feedback action continues until the core 58 of transformer 54 has become saturated.

When such condition of saturation of core 58 has been reached, the regenerative feedback action ceases, so that transistor 45 suddenly becomes non-conductive. The resulting sudden interruption of the current flow in primary 61 of output transformer 62 causes a high voltage to be induced in secondary 64 of the output transformer. Secondary current thus flows to center contact 21 of the distributor, and is fed to the proper spark plug by distributor arm 22.

The tertiary winding 56 of transformer 54 is constantly energized from the direct current source, since one end thereof is connected to positive terminal 66 of the current source through resistor 69 and the other end thereof is connected to ground. The tertiary winding 56 is so constructed as constantly to bias the saturable core 58 toward the negative saturation area of the hysteresis loop of such core; the winding 56 thus functions as a bias winding to reset the saturable core 58 and thus to prepare the circuit for the next triggering pulse. The output of the circuit is controlled by the combination of the ampere turns of the primary 52 and the ampere turns of tertiary winding 56. The frequency of triggering pulses is not a factor which affects the output of the circuit until a point is reached when the triggering impulses recur before the circuit has had time to complete its entire cycle. The time for such cycle can be controlled, within limits, by the current flowing through biasing winding 56; the recycling time does not become a factor affecting the output of the ignition system during the ordinary useful range of engine speeds. Thus in a typical ignition system made in accordance with the invention the output voltage remains substantially constant in the range of from 50–5000 r.p.m.

The ignition circuit shown in FIG. 3 differs from that of FIG. 2 in that it includes a selectively employed extra stage of amplification 71 which is useful in facilitating the starting of the engine. In some instances, the output of the triggering coil 16 is not quite high enough to produce an effective triggering signal for engine starting speeds of less than 200 r.p.m. The added stage of amplification, supplied by stage 71, may be used, for example, at cranking speeds between 50 and 200 r.p.m. Such added stage is not necessary during normal running operations.

In the circuit shown in FIG. 3 there is employed a 3-pole double-throw switch 72 to the upper and lower left-hand poles of which the wires 27 and 36 from triggering coil 16 are connected. Switch 72 may be a part of a relay connected to the starting switch (not shown) so that when the starting switch is activated, the contacts of switch 72 shift into the down or "start" position and so that when the starting switch is deactivated, switch 72 shifts into the upper position shown in FIG. 3.

Switch 72 has an upper movable contactor 73 which selectively engages an upper contact 74 and a lower contact 75. Contact 75 is connected by a wire 77 to the base 35 of transistor 34. Contact 74 is connected, as shown, to wire 31 and thence to emitter 32 of transistor 34. Contactor 73 is constantly connected to wire 31 by a wire 75' and an interposed resistor 76.

The central movable contactor 79 of switch 72 is selectively connected to an upper, unused contact 80 and to a lower contact 81 which is connected by wire 82 to the emitter 84 of a transistor 85.

The lower movable contactor 86 of switch 72 is selectively connected to an upper contact 87 and to a lower contact 90. Contact 87 is permanently connected to contactor 79 by a wire 89, such wire also being connected to wire 77. Contact 90 is connected to the base 92 of transistor 85 by a wire 91. The collector 95 of transistor 85 is connected to wire 37 of stage 25 and thus to ground by a wire 94.

When the switch 72 is in the upper position shown in FIG. 3, the components of the circuit are connected in the same manner as in FIG. 2. Thus wire 27 is directly connected to wire 31 and thence to the collector 32 of transistor 34. Wire 36 is directly connected to the base 35 of transistor 34 by wires 89 and 77. In such position of the switch, the transistor 85 is nonfunctioning.

When switch 72 is thrown into its lower position, as during the starting of the engine, transistor 85 is interposed in the circuit in advance of transistor 34, and functions to amplify the signal transmitted to transistor 34. In such second, "starting" position of switch 72, wire 27 is connected to the emitter 84 of transistor 85 by way of contactor 73, contact 75, wire 89, contactor 79, contact 81, and wire 82. Wire 36 is connected to base 92 of transistor 85 by way of contactor 86, contact 90, and wire 91. The previously shunted connection between contact 74 and wire 31, that is, the wire 75' and resistor 76, now becomes active to bias the base 35 of transistor 34 to provide temperature stabilization. Resistor 76 thus assumes a former function of coil 16, the impedance of which is now employed to provide a feedback loop from base to emitter of transistor 85 to provide temperature stabilization. With the starting of the engine the amplification of the triggering signal strength provided by transistor 85 is no longer necessary. Consequently, as above disclosed, the switch 72 is again shifted into its upper position with the deactivating of the engine-starting switch.

In FIGS. 4 and 5 there is fragmentarily shown a further system for facilitating the starting of the engine. Rather than amplifying the triggering signal source, as in the circuit of FIG. 3, the system of FIGS. 4 and 5 includes means for providing a timed shower or burst of sparks to the ignition system during the engine starting portion of the cycle.

In FIG. 5 there is shown a portion of a wiring diagram for such further system. The portion of the circuit shown in FIG. 5 is adapted to replace stages 24 and 25 in the circuit of FIG. 2. The circuit of FIG. 5 includes a signal generator 99, a timing wheel 100 driven in synchronism with the engine, and a triggering coil timed by the timing wheel and feeding its signal to an amplifying stage 102 and thence to wire 42 which is connected, as in FIG. 2, to the monostable multivibrator.

The signal generator 99 has a center-tapped coil 105 provided with a core 104 of magnetic metal. The center tap 106, which is connected to ground, divides coil 105 into an upper half 103 and a lower half 108. The signal generator is fed from a direct current source, the positive terminal of which is shown at 107, through a selectively operable switch 113, a wire 109, and a current-limiting resistor 110. Preferably, switch 113 is operated by a relay which is activated by the starter switch of the engine, the parts being so disposed that switch 113 is closed only during the period that the starting switch is activated.

From resistor 110 the current is led through a wire 111 to the emitter 112 of a first transistor 114. The base 115 of such transistor is connected by a wire 116 to a resistor 117 which is connected to wire 111. The collector 119 of transistor 114 is connected by a wire 118 to the upper end of coil half 103. The lower end of coil half 108 is connected by a wire 120 through a resistor 121 and a wire 122 to the base 115 of transistor 114. The above-described portion of signal generator 99 functions, when transistor 114 is conductive, to energize coil 103 in such manner as to create flux in a first direction in core 104.

Signal generator 99 is provided with a second, similar reversely connected circuit portion which functions to energize coil 108, in the periods in which transistor 114 is non-conductive, to create flux in core 104 in the reverse direction. Such second circuit part includes a wire 124 connected to resistor 110 of the power source, wire 124 being connected to emitter 125 of a second transistor 126. The base 127 of transistor 126 is connected by a wire 129 and a resistor 130 to wire 124. The collector 131 of transistor 126 is connected to wire 120. A wire 132 and a resistor 134 connects base 127 of transistor 126 to wire 118.

Assuming that at the start of a cycle transistor 114 is conductive and transistor 126 is non-conductive, the flux in core 104 will build up in a first direction until base 115 of transistor 114 attains a potential substantially equaling that of emitter 112. Transistor 114 then becomes non-conductive, and the flux in core 104 collapses. Upon the collapse of the flux in core 104 the polarity of the current in coil-halves 103, 108 reverses so that base 127 of transistor 126 becomes negative relative to emitter 125. Current then flows from emitter 125 to collector 131 to energize coil 108 so that the flux builds up in core 104 in the reverse direction. When, however, the potential of base 127 substantially equals that of emitter 125, such current flow ceases, the flux in the core collapses, and transistor 114 again becomes conductive. Such cycle is repeated continuously and at high speed so long as switch 113 is closed.

The triggering coil 140 is provided with a core 139 in the form of a permanent magnet. The timing wheel 100 is so arranged that it alternately magnetically connects and disconnects cores 104 and 139, the cores being connected in the periods of the cycle in which the ignition system is required to deliver spark discharge and being disconnected at other times. The flux in permanent magnet core 139 is thus rapidly varied by the alternating magnetic flux added thereto by core 104 when timing wheel 100 connects the two cores. The varying magnetic flux in core 139 acts upon the winding 140 of trigger core 104 to produce voltage surges in the wires 141 and 142 leading therefrom. Wire 141 is connected to the emitter 32 of a transistor 34, similar to that similarly designated in FIGS. 2 and 3. The other lead wire 142 is connected to the base 35 of transistor 34. As in the circuits of FIGS. 2 and 3, when emitter 32 is positive relative to base 35, transistor 34 is rendered conductive so that a triggering pulse is transmitted through wire 42. In this instance, however, the "pulse" is in reality a burst or shower of pulses of shorter duration.

The timing wheel 100, the coils 105 and 140, and their respective cores may be conveniently incorporated in a unitary device 133, together with the distributor for the engine, as shown in FIG. 5. In such device a shaft similar to shaft 12 in the first embodiments is journalled in a housing and has the timing wheel 100 fixedly connected thereto. Wheel 100, which is made of magnetic metal such as steel, has a plurality of equally angularly spaced triggering fingers 136 projecting radially from its outer edge. In the embodiment shown, which is adapted for use with an 8-cylinder engine, eight such fingers are employed. The core 104 and the winding 105 thereabout are fixedly mounted in a sub-housing projecting radially from the main housing of device 133. The core 139 and its coil 140 are disposed in a further sub-housing on the main housing of device 133 in the same transverse plane as that of core 104 but displaced therefrom by an angle equaling that between successive fingers 136. The cores 104 and 139 are externally connected by a shunt 137 made of magnetic metal.

When wheel 100 occupies the position shown in solid lines in FIG. 4, the cores 104 and 139 are magnetically coupled by the fingers 136 which are then aligned with the cores and by the body of wheel 100. At such time the variations in magnetic flux in core 104 caused by signal generator 99 are added to the flux of core 139. A shower of sparks thus appears at the spark plug of the engine which is then connected to the ignition circuit by the distributor finger. When, however, wheel 100 is rotated so that the fingers 136 thereon are out of alignment with the cores, the two cores are magnetically disconnected so that the variations in flux in core 104 are not imposed upon core 139. Thus the shower of sparks is created only when an ignition discharge is demanded by the engine.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. In an ignition circuit, a source of timed triggering electrical pulses, a vibrator device including a monostable multivibrator adapted to be triggered in response to said pulses and comprising a triggering winding and a transistor interposed between said source and the multivibrator to control the latter by the pulses, said transistor having a switching circuit, an output circuit comprising a source of direct current power and an output transformer having primary and secondary windings, said primary winding and said triggering winding being connected in series with said power source and said switching circuit so that the output transformer generates a discharge pulse of spark intensity following reception of each triggering pulse by the multivibrator, and a spark discharge device operatively connected to said secondary winding.

2. An ignition circuit as claimed in claim 1, wherein the multivibrator includes a transformer having a primary, a secondary, and a saturable core, said last-named primary being the triggering winding of the multivibrator, and comprising a feedback loop having the secondary of the multivibrator transformer interposed therein, said feedback loop being connected to the transistor so as to bias the transistor to close its switching circuit when the feedback loop is energized.

3. An ignition circuit as claimed in claim 2, comprising a tertiary winding on the multivibrator transformer, said tertiary winding being connected to the source of power to constantly bias the saturable core of the multivibrator transformer toward unsaturated condition.

4. An ignition circuit as claimed in claim 2, comprising a rectifier shunted across the feedback loop, said rectifier allowing current to flow in said loop from the emitter to the base of the transistor.

5. In an ignition system, a source of timed triggering pulses of electric current, a monostable multivibrator powered by said source, said multivibrator comprising a transistor having a triggering circuit and a switching circuit, the source of pulses being connected to the triggering circuit of the transistor, a first, saturable transformer having a primary winding, a secondary winding and a saturable core, one end of each of the primary and secondary windings of the first transformer being connected together and to the switching circuit of the transistor, a source of direct current power, a second, output transformer having a primary winding and a secondary winding, the positive side of the direct current source being connected through the primary winding of the second transformer to the other end of the primary winding of the first transformer, the other end of the secondary winding of the first transformer being connected to the source of current pulses, a closed loop including the secondary of the first transformer and the transistor connected in series, a spark discharge device, the secondary winding of the second transformer being connected to the spark discharge device, and means constantly biasing the saturable core of the first transformer toward the negative saturation area of the hysteresis loop of the core.

6. In an ignition system, a source of timed triggering pulses of electric current, a monostable multivibrator powered by said source, said multivibrator comprising a transistor having a triggering circuit and a switching circuit, the source of pulses being connected to the triggering circuit of the transistor, a first, saturable transformer having a primary winding, a secondary winding, a tertiary winding, and a saturable core, one end of each of the primary and secondary windings of the first transformer being connected together and to the switching circuit of the transistor, a source of direct current power, a second, output transformer having a primary winding and a secondary winding, the positive side of the direct current source being connected through the primary winding of the second transformer to the other end of the primary winding of the first transformer, the other end of the secondary winding of the first transformer being connected to the source of current pulses, a closed loop including the secondary of the first transformer and the transistor connected in series, a shunt circuit including a rectifier connected across the loop from the said other end of the secondary winding of the first transformer to the common connection of the said one end of each of the primary and secondary windings of the first transformer, said shunt circuit preventing the multivibrator from going into self-excited oscillation, and a spark discharge device, the secondary winding of the second transformer being connected to the spark discharge device, and the tertiary winding of the first transformer being connected to the direct current power source so as constantly to bias the saturable core of the first transformer toward the negative saturation area of the hysteresis loop of the core.

7. In an ignition system, a source of timed triggering pulses of unidirectional electric current, said source having a positive and a negative side, a monostable multivibrator powered by said source, said multivibrator comprising a transistor having a base, an emitter, and a collector, the positive side of the source of pulses being connected to the base of the transistor and the negative side of the source being connected to the collector of the transistor, a first, saturable transformer having a primary winding, a secondary winding, a tertiary winding, and a saturable core, one end of each of the primary and secondary windings of the first transformer being connected together and to the emitter of the transistor, a source of direct current power, a second, output transformer having a primary winding and a secondary winding, the positive side of the direct current source being connected through the primary winding of the second transformer to the other end of the primary winding of the first transformer, the other end of the secondary winding of the first transformer being connected to the source of current pulses, a closed loop including the secondary winding of the first transformer and the transistor connected in series, a shunt circuit including a rectifier connected across the loop from the said other end of the secondary winding of the first transformer to the common connection of the said one end of each of the primary and secondary windings of the first transformer, said shunt circuit preventing the multivibrator from going into self-excited oscillation, and a spark discharge device, the secondary winding of the second transformer being connected to the spark discharge device, and the tertiary winding of the first transformer being connected to the direct current power source so as constantly to bias the saturable core of the first transformer toward the negative saturation area of the hysteresis loop of the core.

8. A timing and triggering device for an ignition circuit for an internal combustion engine, comprising a housing, a shaft adapted to be driven in synchronism with the engine, a triggering coil having a core in the form of a permanent bar magnet fixedly positioned on the housing and extending radially relative to said shaft, and a wheel of magnetic metal having a plurality of fingers thereon affixed to the shaft, the fingers being positioned so that the ends thereof sweep past the end of the core to disturb the flux therein and thereby to generate a triggering voltage in the coil upon each such passage of a finger.

9. A timing and triggering device as claimed in claim 8, comprising a high tension distributor rotor on the shaft adapted sequentially to cooperate with a plurality of fixed contacts connected to spark discharge devices at the respective cylinders of the engine.

10. A circuit for generating a succession of timed bursts of electric current pulses, comprising a signal generator emitting signals at a first rate and having a coil subjected to the generated signals, said coil having a core, a second, triggering coil, the triggering coil having a magnetic core, means operative at timed intervals for periodically magnetically connecting and disconnecting the cores of the two coils at a second rate to add the flux disturbances of the two cores during said timed intervals, the first rate markedly exceeding the second rate, whereby to generate a triggering voltage in the triggering coil upon each flux disturbance in the core of the triggering coil.

11. A circuit as claimed in claim 10, wherein the circuit is adapted for triggering an ignition system for an internal combustion engine having a starting switch, and comprising a second switch for activating and deactivating the signal generator, said second switch being connected to the starting switch so that the signal generator operates only when the starting switch is closed.

12. In an ignition system for an internal combustion engine, a timing and triggering device, comprising a housing, a shaft adapted to be driven in synchronism with the engine, a triggering coil having a core in the form of a permanent magnet fixedly positioned on the housing, a second coil having a core fixedly positioned on the housing, a signal generator, the second coil being connected to receive signals emitted at a first rate by the signal generator, and means for periodically distributing the magnetic flux in said triggering coil and magnetically connecting and disconnecting the cores of the two coils at a second rate, said first rate markedly exceeding said second rate.

13. An ignition system as claimed in claim 12, wherein the means for magnetically connecting the cores of the two coils comprises a wheel of magnetic metal having a plurality of radial fingers thereon which sweep past the cores of the coils.

14. An ignition system as claimed in claim 13, wherein the cores of the two coils are disposed in alignment with the fingers on the wheel, the cores are angularly displaced through an angle approximating the angle between adjacent fingers on the wheel, and there is a magnetic shunt connecting the outer ends of the cores.

15. In an ignition system or the like, an electrical triggering signal generator comprising a rotatable drive shaft, a rotor mounted on said shaft for rotation therewith and having at least one radially projecting vane of magnetic material at the periphery thereof, a stationary permanent bar magnet extending radially from adjacent the path of the outer end of said vane, and a coil wound about said magnet.

16. In an ignition system or the like, an electrical trigger signal generator comprising a rotatable drive shaft, a rotor mounted on said shaft for rotation therewith and having at least one radially projecting vane of magnetic material at the periphery thereof, a stationary pick-up coil, and a metallic core comprising a permanent bar magnet within said coil, said core extending radially of said shaft with only the inner end thereof adjacent the path of the outer end of said vane.

17. In an ignition system or the like, an electrical trigger signal generator as defined in claim 16 wherein the end surface of said core adjacent the vane has a width approximating the thickness of the outer end of said vane, said width and thickness being measured in the direction of rotation of the vane.

18. In an ignition system or the like, an electrical trigger signal generator comprising a rotatable drive shaft, a rotor of magnetic metal mounted on said shaft for rotation therewith, the periphery of said rotor being notched to provide at least one sharp reduction in the radius of the peripheral surface thereof, a stationary pick-up coil, and a metallic core comprising a permanent bar magnet within said coil, said core extending radially of said shaft with only the inner end thereof adjacent the periphery of said rotor.

19. A system for generating a succession of timed electrical pulses comprising a source of direct current electrical energy, an output transformer having a primary winding, a monostable multivibrator connected to said source in series with said primary winding, said multivibrator comprising a normally non-conductive electronic switch, and means for periodically generating electrical signals and applying the same to said multivibrator for triggering said switch on, whereby current is caused to flow from said source through said primary winding and switch, said multivibrator comprising means responsive to the flow of said current for rendering said switch non-conductive to thereby interrupt current flow through said primary winding.

20. A system as defined in claim 19, wherein the means for triggering the switch comprises a trigger signal generator including a rotatable drive shaft, a rotor mounted on said shaft for rotation therewith and having at least one radially projecting vane of magnetic material at the periphery thereof, a stationary pick-up coil, and a metallic core comprising a permanent bar magnet within said coil, said core extending radially of said shaft with only the inner end thereof adjacent the periphery of said rotor.

References Cited by the Examiner

UNITED STATES PATENTS

| | | | |
|---|---|---|---|
| 2,446,446 | 8/1948 | Wargin et al. | 310—155 |
| 2,852,589 | 9/1958 | Johnson | 315—209 |
| 2,878,298 | 3/1959 | Giacoletto | 315—209 |
| 2,976,461 | 3/1961 | Dilger | 315—209 |
| 3,032,684 | 5/1962 | Kuykendall | 315—209 |

GEORGE N. WESTBY, *Primary Examiner.*

RALPH G. NILSON, *Examiner.*